April 9, 1929. J. T. FAGAN ET AL 1,708,756
MACHINE FOR MAKING INCANDESCENT LAMPS AND SIMILAR ARTICLES
Filed Feb. 21, 1925  8 Sheets-Sheet 2

INVENTORS:
JOHN T. FAGAN,
FRANCIS J. RIPPL,
JOHN J. MALLOY,
BY
THEIR ATTORNEY.

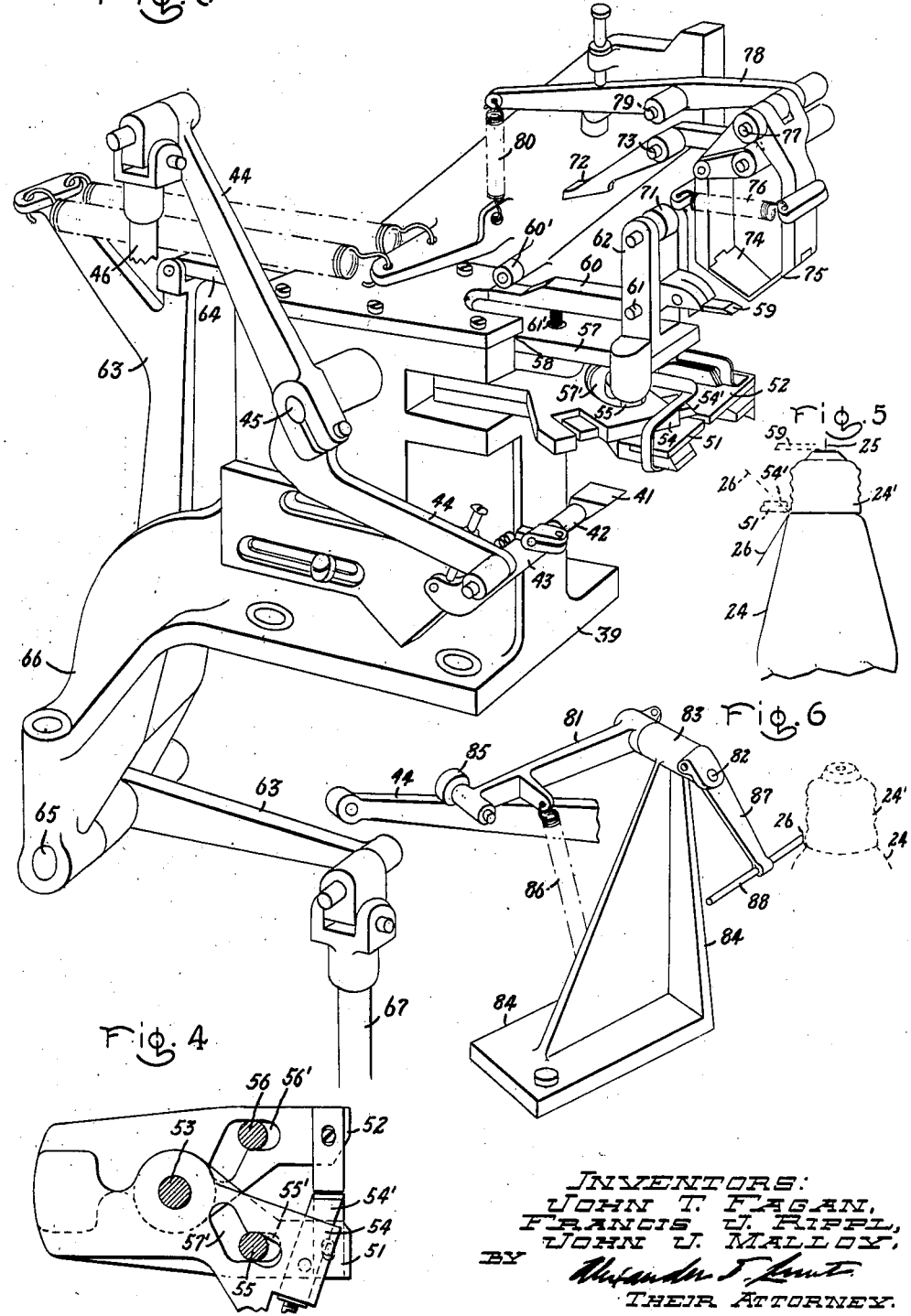

April 9, 1929.   J. T. FAGAN ET AL   1,708,756
MACHINE FOR MAKING INCANDESCENT LAMPS AND SIMILAR ARTICLES
Filed Feb. 21, 1925   8 Sheets-Sheet 4
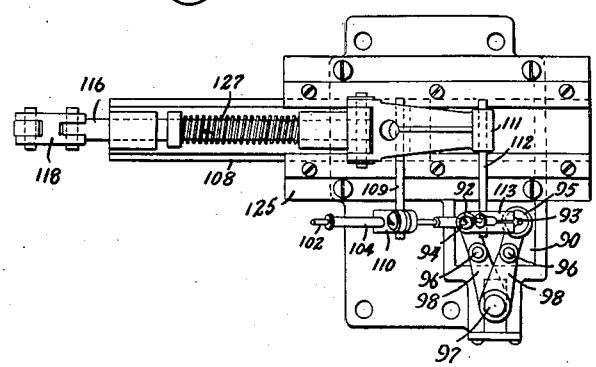
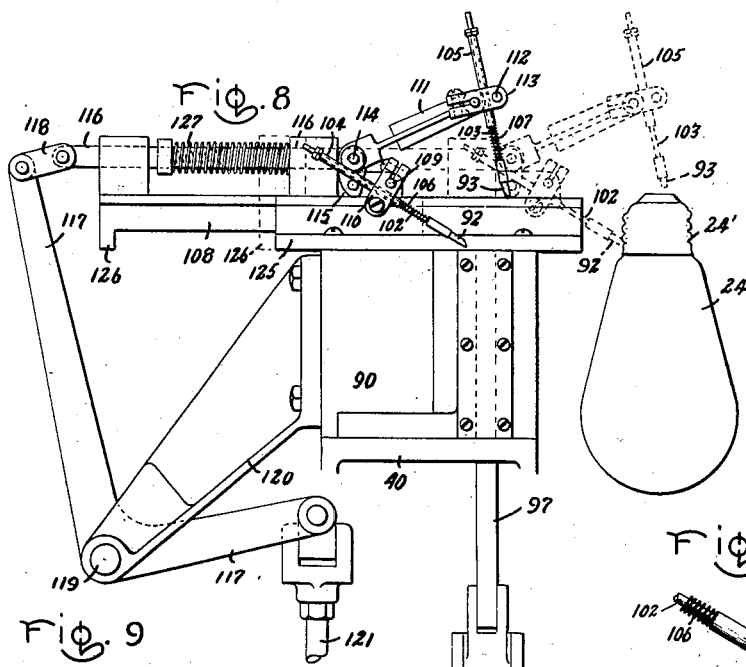
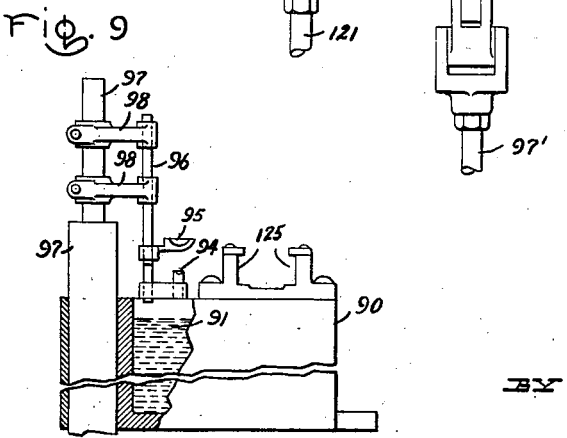
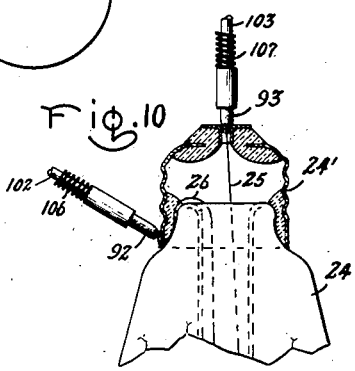
INVENTORS:
JOHN T. FAGAN,
FRANCIS J. RIPPL,
JOHN J. MALLOY,
BY
THEIR ATTORNEY.

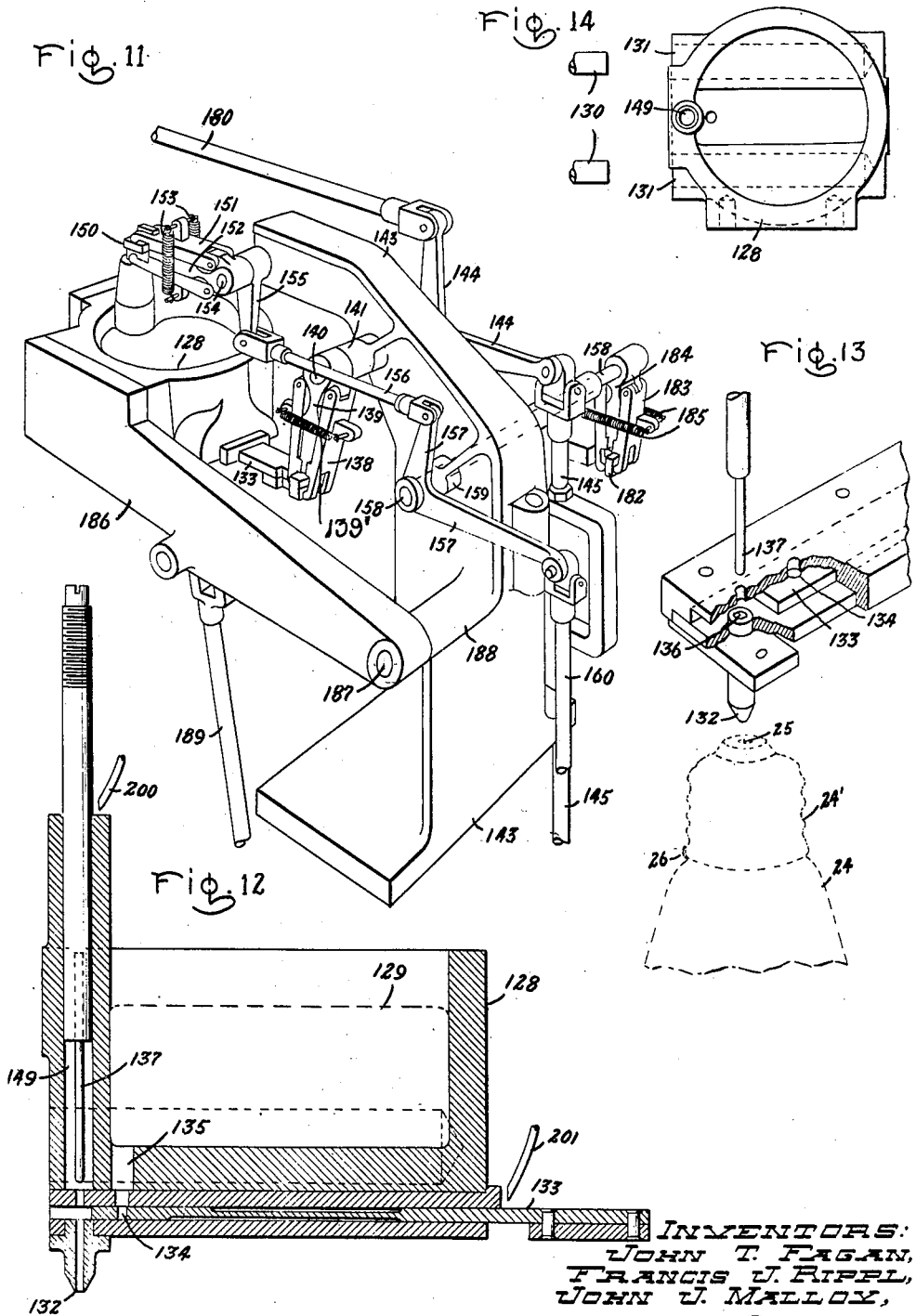

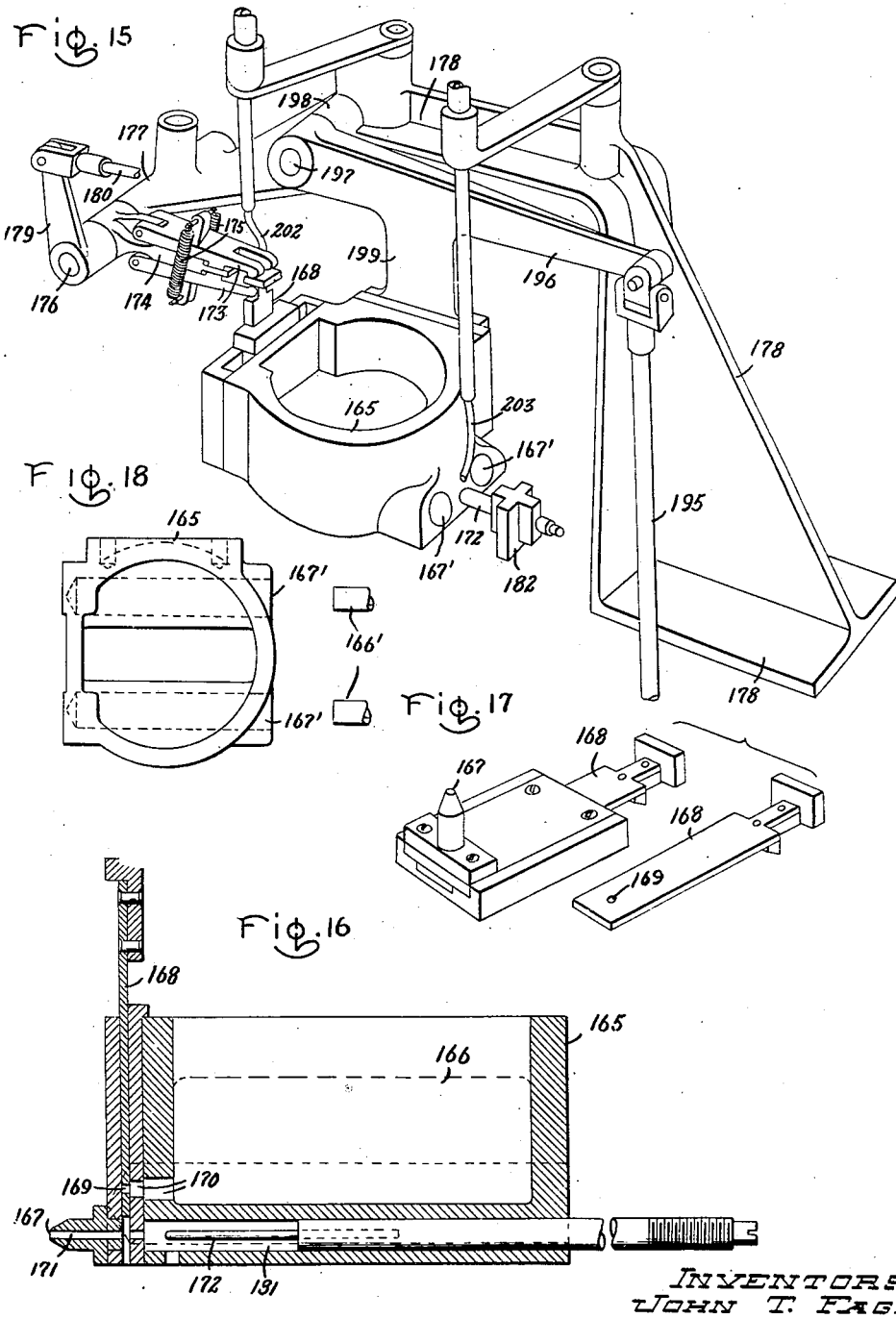

April 9, 1929. J. T. FAGAN ET AL 1,708,756
MACHINE FOR MAKING INCANDESCENT LAMPS AND SIMILAR ARTICLES
Filed Feb. 21, 1925 8 Sheets-Sheet 7
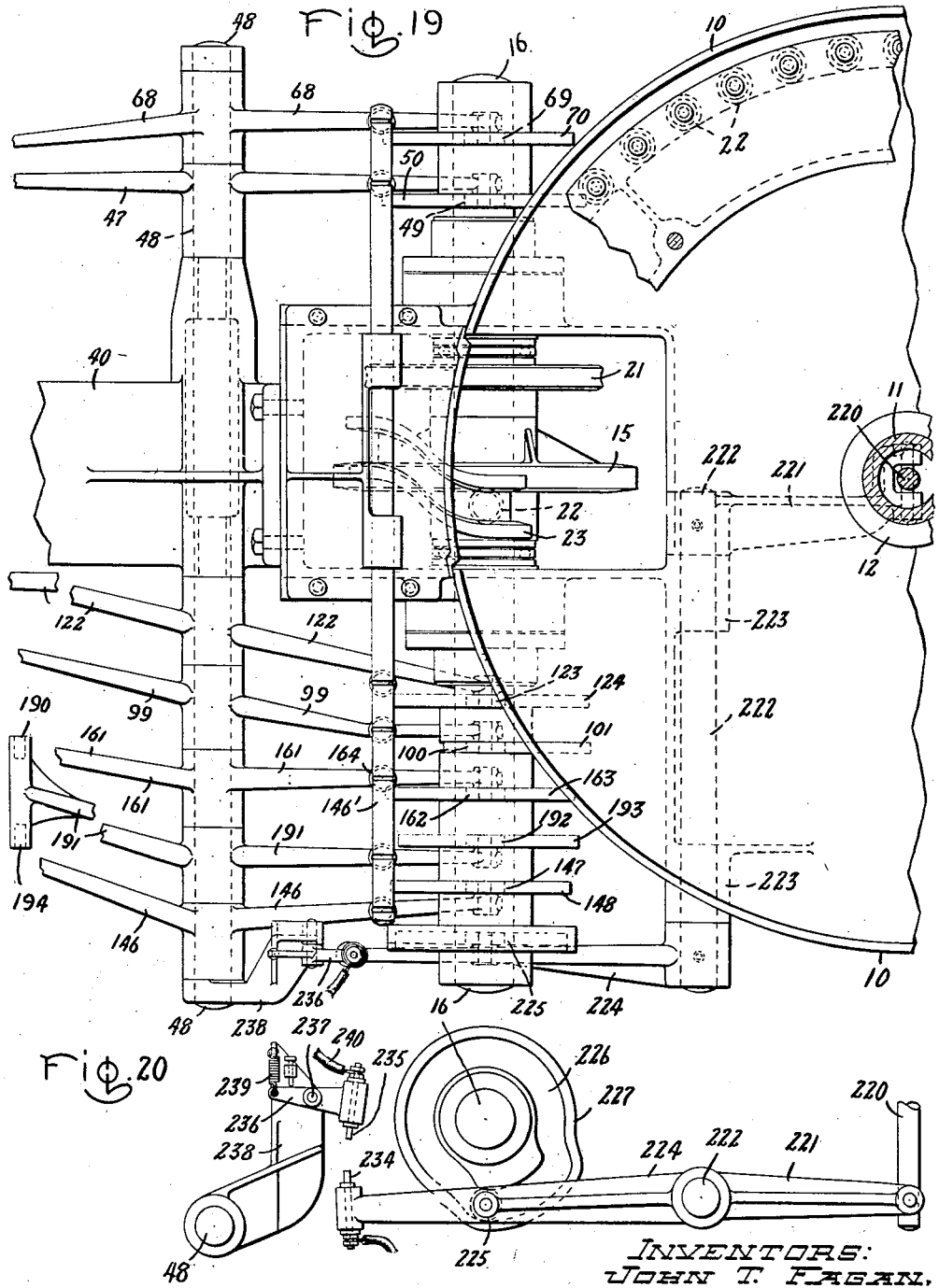

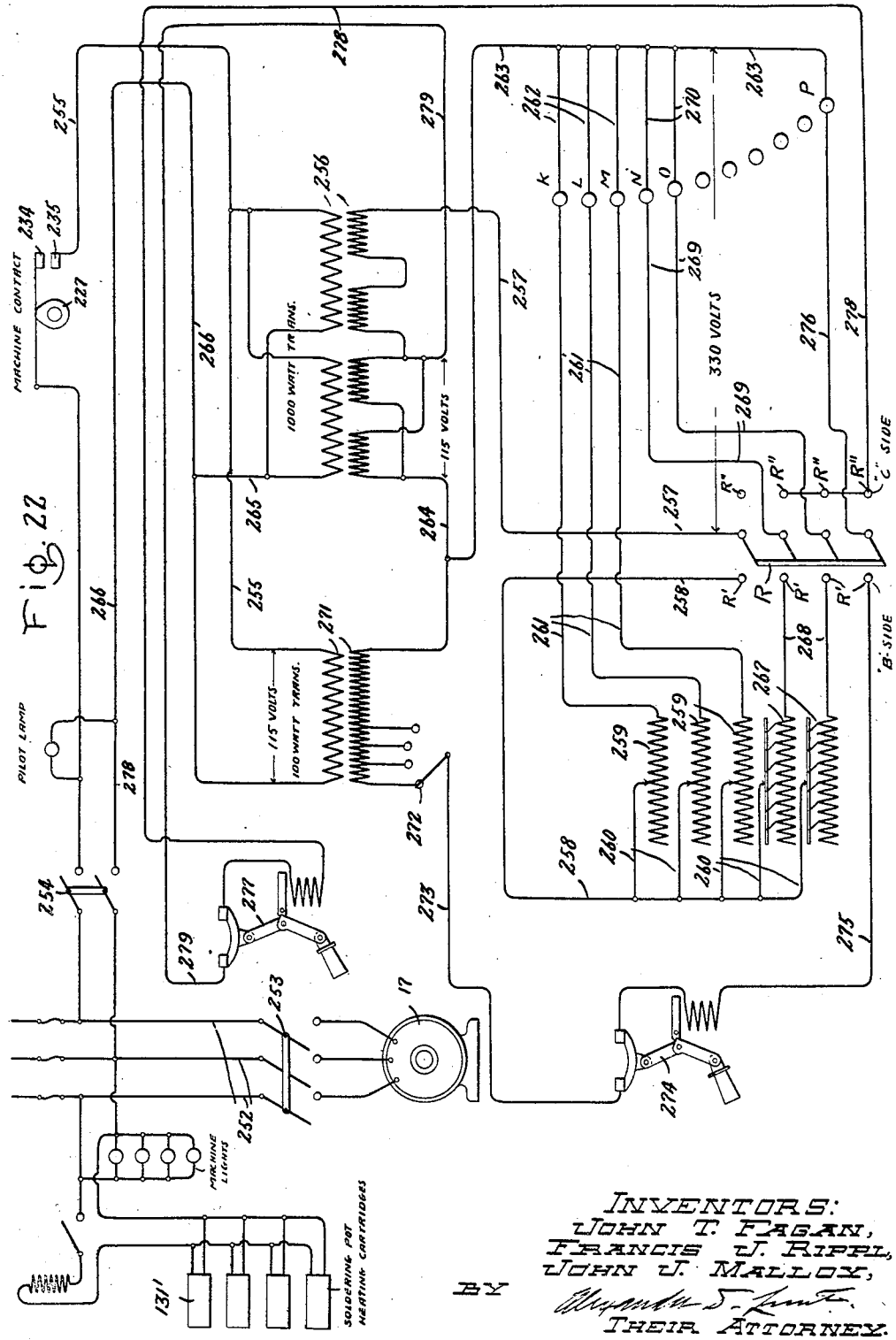

Patented Apr. 9, 1929.                                                         1,708,756

UNITED STATES PATENT OFFICE.

JOHN T. FAGAN, FRANCIS J. RIPPL, AND JOHN J. MALLOY, OF CLEVELAND, OHIO, ASSIGNORS TO GENERAL ELECTRIC COMPANY, A CORPORATION OF NEW YORK.

MACHINE FOR MAKING INCANDESCENT LAMPS AND SIMILAR ARTICLES.

Application filed February 21, 1925. Serial No. 10,956.

Our invention relates to machinery for use in making incandescent lamps and other electrical devices of the same general character. Such devices ordinarily comprise a glass container to which is united a metallic base, and to the base are connected conductors which lead to the filament or other energy translating device within the aforesaid container. The present invention comprises an improved means for uniting, as by soldering, the said conductors to the base. It comprises also an improved means for preliminarily trimming and positioning said conductors relative to said base. Another feature of our invention is the combination of the aforesaid means with a so-called flash-aging means and with each other so that these operations are performed automatically. Various other features and advantages of our invention will appear from the description which follows of a machine constituting a species thereof, and from the appended claims which indicate the scope of the said invention.

Figure 1:
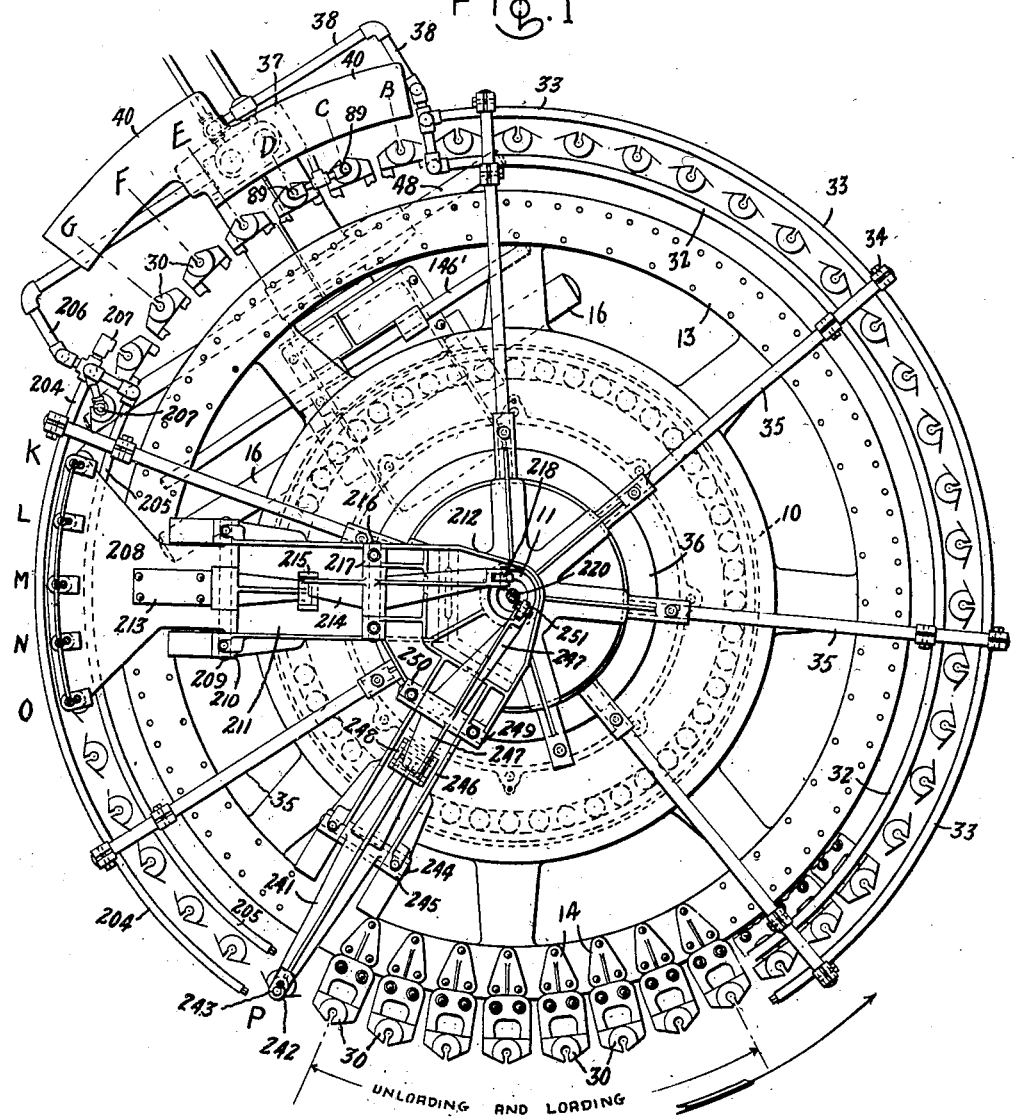
Figure 2:
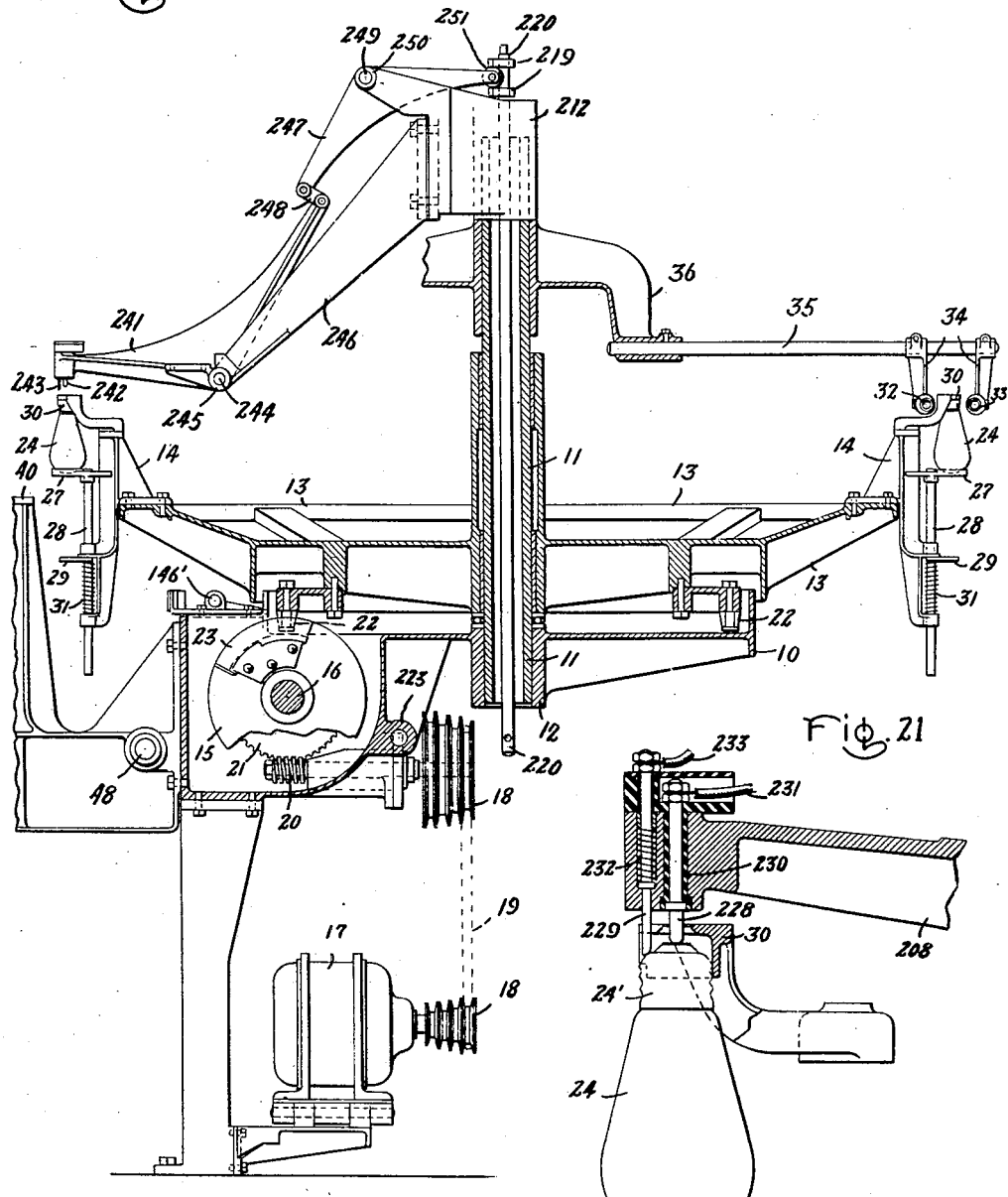
Figure 21:
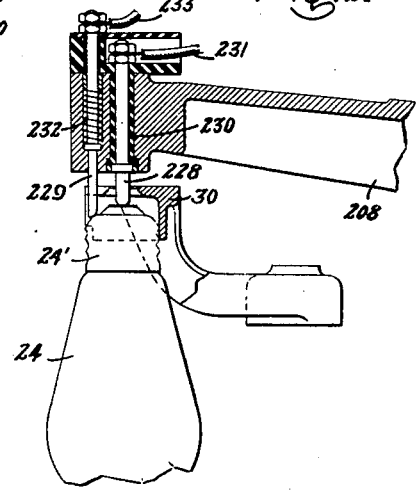

In the drawings Fig. 1 is a partial plan view of the machine; Fig. 2 is a partial vertical section of the same; Fig. 3 is a perspective of the cutting means; Fig. 4 is a fragmentary sectional plan of the cutting knives; Fig. 5 is a fragmentary view showing the positions of the lead wire cutting knives with reference to an incandescent lamp; Fig. 6 is a perspective of the side wire locating mechanism; Fig. 7 is a plan of the flux applying means; Fig. 8 is an elevation of the same; Fig. 9 is a fragmentary elevation partially in section of the flux pot; Fig. 10 is a fragmentary view showing the positions of the flux applying points with reference to an incandescent lamp; Fig. 11 is a perspective view of the top soldering pot; Fig. 12 is an elevational section of same; Fig. 13 is a fragmentary perspective of the ram and slide therefor; Fig. 14 is a plan of the pot and heating means; Fig. 15 is a perspective of the side soldering pot; Fig. 16 is an elevational section of the same; Fig. 17 comprises perspective views of details thereof; Fig. 18 is a plan of the side soldering pot and heating means therefor; Fig. 19 is a plan of the driving means and operating cams; Fig. 20 is a side elevation of the electrical contacting device; Fig. 21 is a fragmentary section of the lamp flashing arm; and Fig. 22 is a diagram of electrical connections.

In the particular arrangement shown in the drawings, the various elements of the machine are carried by a base or table 10 (Figs. 1 and 2). A hollow vertical shaft 11 extends from a bearing 12 in the table 10 and has mounted thereon the rotating turret 13 which carries a number of adjustable bulb holders 14. The turret 13 is intermittently rotated by means of the disc 15 mounted on the main drive shaft 16 which is driven from an outside source such as the motor 17, pulleys 18, belt 19 and worm gear 20—21. The disc 15 engages the rollers 22 which are fastened to the underside of the turret 13, the disc 15 having its edges bevelled to fit between two of the rollers, the angle of bevel being such that all of the surfaces are in rolling contact. The disc gives intermittent motion to the turret which stands still for 320° of the disc rotation and is then indexed by a double face tooth 23 bolted to the disc 15. The tooth 23 occupies 40° of the disc rotation and is designed to give smooth acceleration of the turret in a short space of time. The lower part of the disc and its driving parts are immersed in oil.

Before inserting the lamp bulbs 24 into the holders 14, the operator places a shell or base 24' partially filled with cement over the neck of each bulb at the same time arranging the leading-in wires 25—26 so that they will be in the proper position for cutting and soldering. The assembled lamps are then placed on the adapters 27, which are fastened to the vertical rods 28 slidably mounted in the holders 14. The operator presses down on the handle 29, bringing down the adapter and rod the proper distance for loading. The base of the lamp fits into the socket 30 and the spring 31 acts as a clamp to press the bulb and base together. The turret is then rotated in the direction of the arrow (Fig. 1) carrying the lamps through a heated zone which consists of two circular gas pipes 32—33 supported by brackets 34 which extend from the horizontal rods 35 carried by the spider 36 which is supported by hollow stationary shaft 11. A mixture of gas and air is supplied to the pipes 32—33 from the manifold 37 by means of a connection 38.

After the lamps have passed through the heating zone the bases are firmly cemented to the lamp bulbs. The next operation is to cut off the top and side leading-in wires 25 and 26 respectively, which protrude from the lamp base. This takes place at station B, at which point is located the cutting mechanism shown in Figs. 3, 4, and 5. The cutting mechanism comprises a standard 39 attached to the bracket 40 which is fastened to the table 10 of the machine. As the turret pauses for a short time at this station, it is first necessary to locate the side or shell lead wire 26 in order that the knives may make the proper cut off. A member 41 is mounted on the pin 42 carried by the extension 43 which is yieldingly mounted on one end of the crank 44 which rotates on the shaft 45. The member 41 travels in the path of an arc thus bending the side lead wire up so that it stands at an angle of about 45° (as shown in Fig. 5) above the horizontal so as to make it accessible for the cutting knives. The locating member 41 is operated by means of the vertical rod 46 attached at one end to the crank 44 and to its other end the lever 47 (Fig. 19) which is pivotally mounted on the shaft 48. The lever 47 carries the roller 49, which rides on the cam 50 carried by the main driving shaft 16. The cam 50 is of such shape that at the proper time the vertical rod 46 is pulled down, thus raising the member 41, carrying with it the lead wire to its proper angle with relation to the cutting knife, after which a pair of jaws 51—52 pivotally mounted on the pin 53 are advanced to grip the side wire 26 while it is sheared off by the knife 54. As shown in Figs. 3 and 4, this is accomplished by means of the pins 55—56 which are carried by the slide 57 which rides in the slot 58 of the standard 39. As the slide moves forward the pins 55—56 follow the cam slots 55' and 56' located in the jaws 51—52, thus closing them. Located above the jaw 51 and resting thereon is the knife 54 which is pivotally mounted on the pin 53 and which also closes with the jaws 51—52, only its cam shot 57' is of such shape that after the jaws close the slide continues to move forward until the knife blade 54' shears off the side lead wire 26. The top lead wire 25 is cut by means of the knife blade 59, which is fastened to the bar 60 pivotally mounted on the pin 61 carried by the vertical member 62 extending from the slide 57. The slide 57 is connected to one arm of a bell crank 63 by means of a link 64, said crank being pivotally mounted at 65 to the bracket 66 which forms part of the standard 39. The slide is operated horizontally back and forth by means of the vertical rod 67 attached to one arm of the bell crank 63 and to its other end the lever 68 which is pivotally mounted on the shaft 48 and carries the roller 69 which rides on the cam 70 carried by the main driving shaft 16. The cam 70 is of such shape so that at the proper time the rod 67 is pulled down, thus moving the slide forward. As the slide moves forward a roller 71, carried by the vertical member 62, rides off of the end of a crank 72 which normally rests thereon and which is pivoted at 73 and attached at its other end to one of a pair of gripping jaws 74—75, which close about the top lead wire by means of a spring 76. The gripping jaws are for the purpose of straightening and holding the top lead wire 25 taut so it can be readily cut off by the blade 59. A roller 60' attached to the standard 39 bears against the bar 60, thus forcing the knife 59 against the tension of spring 61' down upon the surface of the lamp holder socket 30 for the purpose of cutting the lead wire 25 as near the lamp base as possible. The jaws 74—75 are pivotally mounted on the shaft 77 which is supported by the rod 78 pivotally mounted at 79 and operating against the tension of spring 80 which is fastened to one end thereof and to the standard 39.

The lamp is now advanced to the next station, which is marked "C" on Fig. 1. As shown in Fig. 6, at this station the side lead wire 26 is forced against the shell for the purpose of bringing the wire as close to the shell as possible so that a good junction will be made when solder is applied. This is accomplished by means of an arm 81 rotatably mounted on a shaft 82 which rests in the bearing 83 carried by the standard 84, said standard being attached to the bracket 40. A roller 85, carried by the arm 81, rests on the crank 44, said roller being held in contact with the crank by means of a spring 86. On the opposite end of the shaft 82 is an arm 87 which carries a locating pin 88 and the lowering of the crank 44 rotates the shaft 82 through the arm 81 which in turn carries the pin 88 through an arc shaped path until it strikes the side lead wire 26 and forces it close against the base of the lamp. At stations C and D the bulb receives a blast of air from nozzles 89 for the purpose of removing short pieces of wire which may have accumulated at the cutting off station B.

The next step is to apply a soldering flux to the parts of the shell or lamp base that are to be soldered. This is accomplished at station "E", where is located a flux pot 90 mounted on the bracket 40 and shown in Figs. 7, 8, 9 and 10. The pot 90 is partially filled with flux 91, which is supplied to the points 92—93 by means of the cups 94—95 attached to the rods 96 carried by the vertical slide 97 by means of the arms 98. The slide is reciprocated by means of the rod 97' attached to the lever 99 (Fig. 19) which is pivotally mounted on the shaft 48 and carries a roller 100 which rides on the cam 101. Normally, the cups 94—95 are in the flux and at the proper time are raised with their supply of flux, touching the points 92—93 and depositing a sufficient amount of flux thereon to be transferred by them to the parts on the lamp base which are to be soldered. The points 92—93 are carried by the rods 102—103 slidably mounted in the tubes 104—105 and operate against springs 106—107. The point 92 which supplies flux to the side of the lamp base is carried by the slide 108 by means of the horizontal rod 109 and clamp 110. The point 93 which supplies flux to the top of the lamp base is attached to the movable bracket 111 through the horizontal rod 112 and clamp 113. The bracket 111 is pivotally mounted at 114 to the rod 116 and has extensions 115 pivotally mounted to the slide 108. After the points 92—93 have been supplied with flux the slide 108 is moved forward in the direction of the bulb. This is accomplished by means of the rod 116 which is attached to one arm of a bell crank 117 through the link 118. The bell crank 117 is pivotally mounted at 119 to the bracket 120, which is fastened to the flux pot 90. Attached to the other arm of the bell crank 117 is the vertical rod 121 which is attached to the lever 122 pivotally mounted on the shaft 48 and carrying at its opposite end a roller 123 which rides on the cam 124. The cam 124 is of such shape that at the proper time the rod 121 is pulled down, thus moving the slide inward toward the lamp. The slide 108 rides in the slot formed by the member 125, and when it is advanced a certain distance the stop 126 strikes against the end of the member 125. By this time the points 92—93 are in the position shown in dotted lines on Fig. 8, the point 92 touching the side of the base and the point 93 somewhat above the top of the base. The rod 116 continues its travel against the spring 127, thus forcing the bracket 111 down and thereby bringing the point 93 in contact with the top of the base, after which the rod 116 and slide 108 are withdrawn, carrying with them the points 92—93 back toward the flux pot for a new supply of flux to be applied to the next lamp base.

The lamp is next advanced to station "F", where solder is automatically applied to the top lead wire 25 from a pot 128 which contains a quantity of molten solder 129. The pot is constantly heated by means of gas burners 130 which direct a flame into the openings 131 located in the pot 128. The pot 128 may also be heated electrically by simply inserting electrical heating cartridge 131' into the openings 131 and connecting them into the circuit as shown in Fig. 22. As shown in Figs. 11, 12, 13 and 14, a definite and accurately measured amount of molten solder which is sufficient to solder the parts together is supplied through the nozzle 132 by means of the horizontally reciprocating slide 133, which has a hole or reservoir 134 for receiving solder from the pot 128 through the passages 135. The slide 133 is then moved forward until the hole or reservoir 134 is in communication with a passage 136 of the nozzle 132 and directly in line with a vertical ram 137 which at the proper time is lowered in order to force the molten solder from the reservoir 134 through the nozzle 132 to the junction of the parts to be soldered at the top of the lamp base. The slide 133 is T shaped at one end so as to receive a pair of spring pressed operating lever fingers 138 which are pivotally mounted on the member 139 and held in position by means of the springs 139'. The member 139 is mounted on the shaft 140, which rests in the bearing 141 formed by the standard 143 carried by the bracket 40. The slide 133 is reciprocated by means of a bell crank 144 which is centered on the shaft 140 and has attached to one end a vertical rod 145, said rod being attached to a lever 146 pivotally mounted on the shaft 48 and carrying at its opposite end a roller 147 which rides on a cam 148 mounted on the main drive shaft 16. The ram 137 which reciprocates in the passage 149 formed in the pot 128 carries at its upper end an adjustable member 150 to which is clamped the operating lever fingers 151 which are pivotally mounted on the member 152 and held in position by means of the springs 153. The member 152 is mounted on the shaft 154, which rests in the bearing formed by the standard 143. The ram 137 is raised and lowered by means of the lever 155 through the link 156 which is pivotally connected at its opposite end to one arm of a bell crank 157 mounted on a shaft 158 which rotates in a bearing 159 formed by the standard 143. The other arm of the bell crank 157 is attached to the vertical rod 160 (Fig. 11), which is attached to the lever 161 pivotally mounted on the shaft 48 and carrying at its opposite end a roller 162 which rides on a cam 163 mounted on the main drive shaft 16. The lever 161 is actuated against the tension of spring 164, which is fastened to the lever and to the holding rod 146'.

The top lead wire having been soldered at station "F", the lamp is now advanced to station "G" where solder is automatically applied to the side lead wire 26 from the pot 165 which is similar in construction to the pot 128 and contains a quantity of molten solder 166. The pot is constantly heated by means of gas burners 166', which direct a flame into openings 167' located in the pot 165. The pot 165 may also be heated electrically by inserting the electrical heating cartridges 131' into the openings 167' and connecting them into the circuit as shown in Fig. 22. As shown in Figs. 15, 16, 17 and 18, an amount of molten solder which is sufficient to firmly solder the side lead wire 26 to the lamp base is supplied through the nozzle 167 by means of the vertical reciprocating slide 168. The slide 168 has located therein a hole or reservoir 169 which receives a definite amount of solder from the pot 165 through the passages 170 and, as shown in Fig. 16, the slide is in position for receiving solder. After the reservoir has received its supply of solder, the slide 168 is moved downward until the reservoir is in communication with a passage 171 of the nozzle 167 and directly in line with a horizontal ram 172, which at the proper time is advanced so as to force the solder from the reservoir 169 through the passage 171 to the junction of the parts to be soldered at the side of the lamp base. The slide 168 is T shaped at its upper end so as to receive a pair of spring pressed operating lever fingers 173 which are pivotally mounted on the member 174 and held in position by means of springs 175. The member 174 is mounted on a shaft 176 which rests in a bearing 177 extending from a standard 178 which is carried by the bracket 40. The slide 168 is raised and lowered by the rotation of the shaft 176 through the lever 179 which is pivotally connected to one end of a rod 180 (Figs. 11 and 15), the other end of which is pivotally connected to one arm of the crank 144, said crank being attached to the shaft 140 which operates the slide 133 of the top soldering pot 128 as hereinbefore described. After the slide 168 has been lowered to a position so that the reservoir 169 is in line with the passage 171, the ram 172 is moved forward. The ram 172, which reciprocates in the passage 181 formed in the pot 165 carries at its outer end an adjustable member 182 shaped so as to receive the operating lever fingers 183, which are pivotally mounted on the member 184 and held in position by means of springs 185. The member 184 is mounted on the shaft 158, which extends through the standard 143 and has attached to its opposite end the crank 157 which also operates the ram 137 of the top soldering pot 128 as hereinbefore described.

At the time the solder is being applied simultaneously to the top of the lamp base at station "F" and to the side of the lamp base at station "G", it is desirable to have the nozzles 132 and 167 comparatively close to their respective lamp bases in order that solder will be deposited at the proper point on the said bases. This is accomplished by having the soldering pots mounted so as to be capable of moving toward the lamp bases at the proper time. The top soldering pot 128 is carried by an arm 186 which is rotatably mounted on the shaft 187 which rests in a bearing 188 of the standard 143. The arm 186 is rotated about the shaft 187 by means of the rod 189 being fastened at its opposite end to one side 190 (Fig. 19) of a lever 191. The said lever is pivotally mounted on the shaft 48 and carries at its opposite end a roller 192, which rides on a cam 193 mounted on the main drive shaft 16. The cam 193 also operates the movement of the side soldering pot 165 through the roller 192 and lever 191, which has attached at 194 the rod 195. The rod 195 is pivotally mounted at its upper end to an arm 196, which is rotatably mounted on a shaft 197 which rests in a bearing 198 formed by the standard 178. The arm 196 carried the pot 165 by means of the bracket 199, which extends therefrom.

The slide 133 and the ram 137 of the top soldering pot 128 may be lubricated by any well-known oilers (not shown) which deliver oil through the pipes 200 and 201. This is also true of the slide 168 and ram 172 of the side soldering pot 165, in which case oil is supplied through pipes 202 and 203.

The soldering operations being completed, the lamp is intermittently advanced through a cooling zone where cool air is blown against the base of the lamp from the circular pipes 204 and 205, which are supplied with air through the pipe 206. A pair of nozzles 207 direct a blast of cool air against the side and on the top of the lamp base in order to hasten the hardening of the solder thereon.

As the lamps are intermittently advanced through the cooling zone they are flash-aged or seasoned. This aging process takes place at stations K, L, M, N and O, where is located an arm 208 which is capable of moving in and out of the path of the advancing lamps for the purpose of making contact with said lamps and sending an electrical current through them at the proper time. As shown in Figs. 1, 2, 19 and 20, the flashing arm 208 is pivotally mounted on a shaft 209 which rests in bearings 210 formed by the holding bracket 211, which is attached to the hollow standard 212 carried by the vertical shaft 11. The flashing arm 208 is raised and lowered by means of an arm 213 which is pivotally mounted on the shaft 209, one side of said arm being fastened to the flashing arm and the other side being connected to one arm of a crank 214 through links 215. The crank 214 is pivotally mounted on a shaft 216 which is mounted in bearings 217 formed by the standard 212. The other arm of the crank carries a roller 218 which rests between the horizontal members 219 (Fig. 2) carried by the vertical rod 220, which extends through the hollow shaft 11 and has attached to its lower end an arm 221, (Fig. 19), said arm being mounted upon a shaft 222 which is supported in bearings 223 forming part of the table 10. Mounted at the opposite end of the shaft 222 is an arm 224 carrying a roller 225, which rides in the cam slot 226 of the cam 227, said cam being mounted on the main drive shaft 16. The flashing arm 208 makes contact with the lamps simultaneously at stations K, L, M, N and O by means of the contacting members 228 and 229 which are carried by said arm and located at each station. As shown in Fig. 21, the contacts 228 are stationary and are insulated from the arm by means of bushings 230 which extend through the said arm. The contacts 228 are connected to the positive side of an electric circuit by means of a conductor 231.

The contacts 229 are movable and work against the tension of springs 232, the upper end of said contacts being connected to the negative side of an electric circuit by means of the conductor 233.

After a lamp has arrived at station "K", the arm 208 is lowered and the movable contact 229 first touches the side of the lamp base, and with a continued downward movement of the arm, the stationary contact strikes against the top of the base, thus forcing the lamp and its adapter 27 down against the tension of spring 31 to the position shown in Fig. 21. This is for the purpose of having the lamp out of contact with its socket 30 prior to flashing in order to avoid a short circuit. After the lamp has been lowered a safe distance from its socket 30, an electrical connection is made whereby the lamp is flashed, after which the electrical connection is broken and the arm 208 raised, whereupon the turret 13 is rotated, thus transferring the lamp to the next station "L", where the cycle is again repeated. This also applies to stations M, N and O. As shown in Figs. 19, 20 and 22, the cam 227, which operates the raising and lowering of the arm 208 also operates the make and break mechanism for the electrical circuit by means of a contact 234 which is carried at the end of arm 224. The cam 227 is so constructed that when a lamp is forced down the proper distance, the contact 234 is raised and makes contact with contact 235, which is carried by the arm 236 pivotally mounted at 237 on a bracket 238 mounted on the shaft 48. The contact 235 is moved against the tension of spring 239 and is connected to one side of the main electrical circuit through the conductor 240. The purpose of the contacts 234 and 235 are to close the electrical circuit after a connection between the lamp base and the contacts 228 and 229 is completed, thus preventing any arcing between the lamp base and the contacts in case of a short circuited lamp.

The lamp having been flashed at stations K, L, M, and N and O, it is intermittently carried through the cooling zone, eventually reaching station "P", where it is again flashed for the purpose of final inspection. As shown in Figs. 1 and 2, the flashing is accomplished by means of an arm 241 similar to arm 208, having a pair of contacts 242 and 243 similar to contacts 228 and 229. The arm 241 is pivotally mounted on a shaft 244, which rests in bearings 245 carried by the holding bracket 246 similar to bracket 211, and which is also attached to the hollow standard 212 carried by the shaft 11. The arm 241 is connected to one arm of a crank 247 through the links 248. The crank 247 is pivotally mounted on a shaft 249 which is mounted in bearings 250 formed by the standard 212 and carries at its opposite end a roller 251 which rests between the horizontal members 219 carried by the vertical rod 220. At the proper time the arm 241 is lowered in order that its contacts 242 and 243 may contact with the lamp base. This is accomplished by the rod 220, arm 221, shaft 222, arm 224, roller 225 and cam 227, which were previously described in connection with the operation of the flashing arm 208. As the lamp is flashed at station "P", the operator inspects it for appearance defects, such as mounts not central, bulb checks, and also for filament defects, gassy lamps, etc., whereupon the poor lamps are discarded and the good lamps removed and placed in cartons.

A diagram of electrical connections for the machine is shown in Fig. 22. The wiring is arranged for flashing either vacuum or gas filled lamps. The motor 17, which operates the machine, receives its supply of current from the main power lines 252 when the circuit is closed by means of a switch 253. The current for flash-aging operations is also supplied from the main power lines 252, and is connected into the circuit by means of a switch 254. Assuming the machine is operating upon vacuum lamps and there is a lamp at stations K, L, M, N, O, and P, the switch R is thrown in on the "B" side, thereby covering the contacts R'. As the flashing arms 208 and 241 are lowered so as to make contact with the lamps and move them away from their sockets 30, the machine contacts 234—235 touch each other so as to close the circuit, whereupon the current flows through conductor 255, transformer 256, conductor 257, switch R, and conductor 258. At stations K, L, M, N and O the lamps receive their flashing voltage through ballast resistances 259 and 267, which are connected to the conductor 258 through the adjustable arm 260. At stations K, L and M, the lamps are flashed at 110% of their normal rate of voltage through the conductors 261, which lead to one side of the lamps, and out through conductors 262, 263, 264, and 265 and 266. At stations N and O the lamps are flashed at 130% of their normal rate of voltage through resistances 267. The current then flows through conductors 268, switch R, conductors 269 which lead to one side of the lamps and out through conductors 270 into the common outlet conductor 263. At station "P" the lamp is flashed at 130% of its normal rate of voltage without resistance in series. This is accomplished by means of the current flowing through the main conductor 255, small transformer 271, out through one of the taps 272, conductor 273, overload circuit breaker 274, conductor 275, switch R, and conductor 276 which leads to one side of the lamp and out through the common conductor 263.

When the machine is operating upon gas filled lamps, the switch R is thrown in on the "C" side, thereby covering the contacts R", in which case the lamps are flashed only at positions N, O, and P, where they receive 100% voltage without ballast resistance. The path of the current for gas filled lamps is through main conductor 255, transformer 256, conductor 257, switch R and conductors 269 to one side of the lamps at stations N and O and out through conductors 270 to common conductor 263. Conductor 257 leads to the lamp at station "P" through switch R, and conductor 276 to one side of the lamp and out through common conductor 263.

Short circuited lamps may be detected in the following manner: Vacuum lamps which are shorted pass the five initial flashing stations, namely K, L, M, N, and O, which receive their current from the large transformer 256, the ballast resistances 259 and 267 limiting the current. At station "P" the 130% direct voltage is supplied by the small transformer 271. At station "P" a crossed wire lamp opens the circuit breaker 274, but does not stop the machine motor 17. Gas filled lamps which are short circuited may open the circuit either at stations N, O, or P, by means of a circuit breaker 277 through conductors 278—279. The circuit breaker 277 can be so mounted as to stop the machine in order that the operator may remove the shorted lamps.

What we claim as new and desire to secure by Letters Patent of the United States is:—

1. The combination of means for supporting an assembly comprising a glass container, a base and conductors extending from said container to said base, and an automatically operating means for trimming said conductors and positioning their ends so that they may be subsequently united to said base.

2. The combination of means for supporting an assembly comprising a glass container, a base comprising a shell and another terminal insulated therefrom, and conductors, one extending from said container to said shell and another to said other terminal, and an automatically operating means for trimming said conductors and positioning their ends so that they may be united to said shell and said other terminal respectively.

3. The combination of a carrier for supporting an assembly comprising a glass container, a base comprising a shell and other terminal insulated therefrom, and conductors extending from said container to said base and having their ends contiguous to said shell and other terminal respectively, a container for solder, means for advancing said carrier and automatic means suitably timed therewith for delivering small amounts of solder to unite said ends to said shell and other terminal respectively.

4. The combination of a carrier for supporting an assembly comprising a glass container, a base comprising a shell and other terminal insulated therefrom, and conductors extending from said container to said base and having their ends contiguous to said shell and other terminal respectively, a container for solder, a container for flux, means for advancing said carrier and automatic means suitably timed therewith for delivering small amounts of solder and flux to unite said ends to said shell and other terminal respectively.

5. The combination of a carrier for supporting an assembly comprising a glass container, a base and conductors extending from said container to said base, a means for trimming and positioning said conductors, means for applying solder to unite the ends of said conductors to said base, means for advancing said carrier, and automatic means timed with the movement of said carrier for operating said positioning and trimming means and said soldering means.

6. The combination of a carrier for supporting a series of assemblies each comprising a glass container, a base and conductors extending from said container to said base, means for trimming and positioning said conductors, means for applying solder to unite the ends of said conductors to said base, means for advancing said carrier, and automatic means timed with the movement of said carrier for operating said positioning and trimming means and said soldering means.

7. The combination of a carrier for supporting an assembly comprising a glass container, an energy translation means within said container, a base and conductors leading from said energy translation means to said base, a means for uniting the ends of said conductors to said base, aging means for passing electric current through said conductors and said energy translation means, means for advancing said carrier, and automatic means whereby the aforesaid uniting and aging means are successively brought into operation in proper timed relation with the movement of said carrier.

8. The combination of a carrier for supporting a series of assemblies, each comprising a glass container, an energy translation means within said container, a base and conductors leading from said energy translation means to said base, means for uniting the ends of said conductors to said base, aging means for thereafter passing electric current through said conductors and said energy translation means, means for advancing said carrier, and automatic means whereby the aforesaid uniting and aging means are successively brought into operation in proper timed relation with the movement of said carrier.

9. The combination of a carrier for supporting an assembly comprising a glass container, an energy translation means within said container, a base and conductors leading from said energy translation means to said base, means for trimming and positioning said conductors means for uniting the ends of said conductors to said base, aging means for thereafter passing electric current through said conductors and said energy translation means, means for advancing said carrier, and automatic means whereby the aforesaid trimming, uniting and aging means are successively brought into operation in proper timed relation with the movement of said carrier.

10. The combination of a carrier for supporting a series of assemblies, each comprising a glass container, an energy translation means within said container, a base and conductors leading from said energy translation means to said base, means for trimming and positioning said conductors, means for uniting the ends of said conductors to said base, aging means for thereafter passing electric current through said conductors and said energy translation means, means for advancing said carrier, and automatic means whereby the aforesaid trimming, uniting and aging means are successively brought into operation in proper timed relation with the movement of said carrier.

11. In a machine, the combination of means for supporting an assembly comprising a glass container, a base and a wire extending beyond said base from said container, means for moving said supporting means, a wire trimming means disposed in the path of travel of said assembly, and automatic means for causing said trimming means to be actuated to shear said wire at a point adjacent to said base.

12. In a machine, the combination of means for supporting an assembly comprising a glass container, a base and a plurality of wires extending beyond said base from said container, means for moving said supporting means, a wire trimming means disposed in the path of travel of said assembly, and automatic means for causing said trimming means to be actuated to shear said wires at points adjacent to said base.

13. In a machine, the combination of means for supporting an assembly comprising a glass container, a base and a wire extending beyond said base from said container, means for moving said supporting means, a wire trimming means disposed in the path of travel of said assembly, automatic means for causing said trimming means to be actuated to shear said wire at a point adjacent to said base, and means for thereafter pressing the end of said wire against said base.

14. In a machine, the combination of means for supporting an assembly comprising a glass container, a base and a pair of wires extending from said container beyond said base, one longitudinally through said base and the other transversely of and beyond said base, means for moving said supporting means, wire trimming means disposed in the path of travel of said assembly, and automatic means for causing said means to be actuated to shear said wires at points adjacent to said base.

15. In a machine, the combination of means for supporting an assembly comprising a glass container, a base and a pair of wires extending from said container beyond said base, one longitudinally through said base and the other transversely of and beyond said base, means for moving said supporting means, wire trimming means disposed in the path of travel of said assembly, automatic means for causing said means to be actuated to shear said wires at points adjacent to said base, and means for thereafter pressing the end of said transversely extending wire against said base.

16. In a machine, the combination of means for supporting an assembly comprising a glass container, a base and a wire extending from within said container transversely of and beyond said base, means for moving said supporting means, means for preliminarily positioning the outer end of said wire and means for thereafter cutting off said end disposed in the path of travel of said assembly, and automatic means for actuating said positioning and cutting means in sequence.

17. The combination of means for supporting an assembly comprising a glass container, a base and a conductor extending from said container to said base, means for moving said supporting means and means disposed in the path of travel of said assembly and automatically brought into operation for trimming said conductor and thereafter uniting the end thereof to said base.

18. The combination of means for supporting an assembly comprising a glass container, a base and a conductor extending from said container to said base, means for moving said supporting means and means disposed in the path of travel of said assembly and automatically brought into operation for trimming said conductor and thereafter soldering the end thereof to said base.

19. In a cutting apparatus, the combination of means for supporting an assembly comprising a glass container, a base and a wire protruding therefrom, a wire holding means and a cutting means mounted adjacent to said supporting means, and means for causing said wire holding means to engage said wire during the cutting operation.

20. In a cutting apparatus, the combination of means for supporting an assembly comprising a glass container, a base and a wire protruding therefrom, a wire holding means and a cutting means mounted adjacent to said supporting means, and automatic means for causing said wire holding means to engage a portion of said wire and for advancing said cutting means toward said wire to shear it at a point adjacent to said base.

21. In a cutting apparatus, the combination of means for supporting an assembly comprising a glass container, a base and a wire protruding longitudinally beyond said base, a wire holding means and a cutting means mounted adjacent thereto, automatic means for causing said wire holding means to engage a portion of said wire, and automatic means for advancing said cutting means toward said wire to shear it in a plane coincident with the adjacent surface of the said base.

22. In a cutting apparatus, the combination of means for supporting an assembly comprising a glass container, a base and a plurality of wires protruding therefrom, a plurality of wire holding means and cutting means mounted adjacent to said assembly supporting means, and means for causing said wire holding means to engage said wires and hold them during the cutting operation.

23. In a cutting apparatus, the combination of means for supporting an assembly comprising a glass container, a base and a plurality of wires protruding therefrom, a plurality of wire holding means and cutting means mounted adjacent to said assembly supporting means, automatic means for causing said wire holding means to engage portions of said wires and to hold them in position, and automatic means for causing the said cutting means to advance toward said wires and shear them at points adjacent to said base.

24. In a cutting apparatus, the combination of means for supporting an assembly comprising a glass container, a base and a pair of wires extending from said container beyond said base, one longitudinally through said base and the other transversely of and beyond said base, means for positioning one of said wires, means for engaging and holding each of said wires, and a pair of cutters adapted to be brought into operation so as to shear each of said wires at a point adjacent to said base.

25. In a cutting apparatus, the combination of means for supporting an assembly comprising a glass container, a base and a pair of wires extending from said container beyond said base, one longitudinally through said base and the other transversely of and beyond said base, automatic means for positioning one of said wires, automatic means for engaging and holding each of said wires, and a pair of cutters adapted to be brought into operation so as to shear each of said wires at a point adjacent to said base.

26. The combination of a movable carrier for supporting an assembly comprising a base and a wire having a portion thereof disposed contiguous to said base, a receptacle adapted to contain a quantity of molten solder mounted adjacent to the path of travel of said assembly, a nozzle having a passage therethrough adapted to register with the aforesaid portion of said wire, means operated in proper timed relation with the movement of said carrier for delivering a piece of solder from said receptacle and placing it in registry with the passage in said nozzle, and means also operated in proper timed relation therewith for advancing said piece of solder to unite said wire with said base.

27. The combination of a movable carrier for supporting an assembly comprising a base and a wire having a portion thereof disposed contiguous to said base, a receptacle adapted to contain a quantity of molten solder mounted adjacent to the path of travel of said assembly, a nozzle having a passage therethrough adapted to register with the aforesaid portion of said wire, a slide reciprocated in proper timed relation with the movement of said carrier and having a reservoir therein to receive a piece of solder from said receptacle, and means also operated in proper timed relation therewith for advancing said piece of solder to unite said wire with said base.

28. The combination of a movable carrier for supporting an assembly comprising a base and a wire having a portion thereof disposed contiguous to said base, a receptacle adapted to contain a quantity of molten solder mounted adjacent to the path of travel of said assembly, a nozzle having a passage therethrough adapted to register with the aforesaid portion of said wire, a slide reciprocated in proper timed relation with the movement of said carrier and having a reservoir therein to receive a piece of solder from said receptacle, and a plunger also operated in proper timed relation therewith for advancing said piece of solder to unite said wire with said base.

In witness whereof, we have hereunto set our hands this 19th day of February, 1925.

JOHN T. FAGAN.
FRANCIS J. RIPPL.
JOHN J. MALLOY.